US012761077B2

(12) United States Patent

Kinoshita et al.

(10) Patent No.: US 12,761,077 B2

(45) Date of Patent: Oct. 13, 2026

(54) DRIVE DEVICE AND COLORIMETER DEVICE

(71) Applicant: SEIKO EPSON CORPORATION, Tokyo (JP)

(72) Inventors: Yoshiki Kinoshita, Suwa (JP); Masaki Ito, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 18/674,048

(22) Filed: May 24, 2024

(65) Prior Publication Data

US 2024/0393175 A1 Nov. 28, 2024

(30) Foreign Application Priority Data

May 26, 2023 (JP) ................................ 2023-086771

(51) Int. Cl.

| | |
|---|---|
| ***G01J 3/02*** | (2006.01) |
| ***G01J 3/50*** | (2006.01) |
| ***H02K 7/10*** | (2006.01) |
| ***H02K 11/21*** | (2016.01) |

(52) U.S. Cl.

CPC ............... *G01J 3/0202* (2013.01); *G01J 3/50* (2013.01); *H02K 7/1004* (2013.01); *H02K 11/21* (2016.01)

(58) Field of Classification Search

CPC ................................. G01J 3/0202; G01J 3/50

See application file for complete search history.

(56) References Cited

U.S. PATENT DOCUMENTS

| | | | | |
|---|---|---|---|---|
| 8,169,614 | B2 * | 5/2012 | Onishi | G01J 3/02 356/402 |
| 11,799,339 | B2 * | 10/2023 | Hattori | H02K 21/14 |
| 2013/0003141 | A1 | 1/2013 | Kawasaki | |
| 2017/0131673 | A1 | 5/2017 | Miyazaki | |
| 2019/0330001 | A1 * | 10/2019 | Matsuda | G03G 15/6561 |

FOREIGN PATENT DOCUMENTS

| | | | | |
|---|---|---|---|---|
| CN | 214398746 | * | 10/2021 | B66G 47/34 |
| CN | 217445118 | * | 9/2022 | H02K 5/00 |
| JP | 2013-011655 A | | 1/2013 | |
| JP | 2017-088310 A | | 5/2017 | |

OTHER PUBLICATIONS

Machine translation of CN 214398746; Cao et al. (Year: 2021).*
Machine translation of CN217445118; Wen et al. (Year: 2022).*

* cited by examiner

*Primary Examiner* — Terrance L Kenerly

(74) *Attorney, Agent, or Firm* — WORKMAN NYDEGGER

(57) ABSTRACT

A drive device includes a drive motor including a rotation shaft, a sensor unit including a slit disk in which is formed a plurality of slits and a sensor that detects the slits, and a holding member, wherein the slit disk is attached to the rotation shaft and the drive motor and the sensor are attached to the holding member.

12 Claims, 12 Drawing Sheets

DRIVE DEVICE AND COLORIMETER DEVICE

The present application is based on, and claims priority from JP Application Serial Number 2023-086771, filed May 26, 2023, the disclosure of which is hereby incorporated by reference herein in its entirety.

BACKGROUND

1. Technical Field

The present disclosure relates to a drive device and a colorimeter device.

2. Related Art

An example of this type of drive device is described in JP-A 2013-11655 and JP-A 2017-88310. JP-A 2013-11655 discloses an image reading device that includes a support plate that supports a motor and an encoder that detects the rotation of the motor. JP-A 2017-88310 discloses a sheet storage device that includes a rotary member disposed on the outer peripheral surface side of a timing belt bridging pulleys.

Each of the above-described devices may be carried and used. When the device is dropped while being carried, the device receives a large drop impact. JP-A 2013-11655 and JP-A 2017-88310 do not consider an effective drop impact tolerance structure.

SUMMARY

A drive device according to the present disclosure, for solving the above problems, includes a drive motor including a rotation shaft, a sensor unit including a slit disk in which is formed a plurality of slits and a sensor that detects the slits, and a holding member, wherein the slit disk is attached to the rotation shaft and the drive motor and the sensor are attached to the holding member.

A colorimeter device according to the present disclosure, includes the drive device according to any one of the first to fourth aspects (described later), a colorimeter configured to measure a color of a measurement target, and a carriage supporting the colorimeter and configured to scan the colorimeter.

A drive device according to the present disclosure, includes a first pulley, a second pulley, a timing belt stretched between the first pulley and the second pulley, a drive motor configured to drivingly rotate the first pulley, and a belt regulating section that regulates a shifting movement of the timing belt, wherein the belt regulating section has a regulating face formed along an outer peripheral surface of the timing belt at a position where the timing belt is stretched around the first pulley.

A colorimeter device according to the present disclosure, includes the drive device according to any one of the sixth to tenth aspects (described later), a colorimeter configured to measure the color of an object, a carriage configured to accommodate the colorimeter, and a gantry in which the carriage is movably attached and movable in a direction intersecting the moving direction of the carriage.

A drive device according to the present disclosure, includes a first pulley, a second pulley, a timing belt stretched between the first pulley and the second pulley, a drive motor configured to drivingly rotate the first pulley, a shaft member coupled to the first pulley and disposed in a direction along the rotation axis of the first pulley, a bearing that rotatably supports the shaft member and a frame to which the bearing is attached in a state of being inserted into an insert section, and a detachment restriction section that restricts movement of the bearing in a direction that the bearing detaches from the insert section.

A colorimeter device according to the present disclosure, includes a drive device according to the twelfth aspect (described later), a colorimeter configured to measure the color of an object, a carriage configured to accommodate the colorimeter, and a gantry in which the carriage is movably attached and movable in a direction intersecting the moving direction of the carriage.

DESCRIPTION OF EMBODIMENTS

Figure 1:
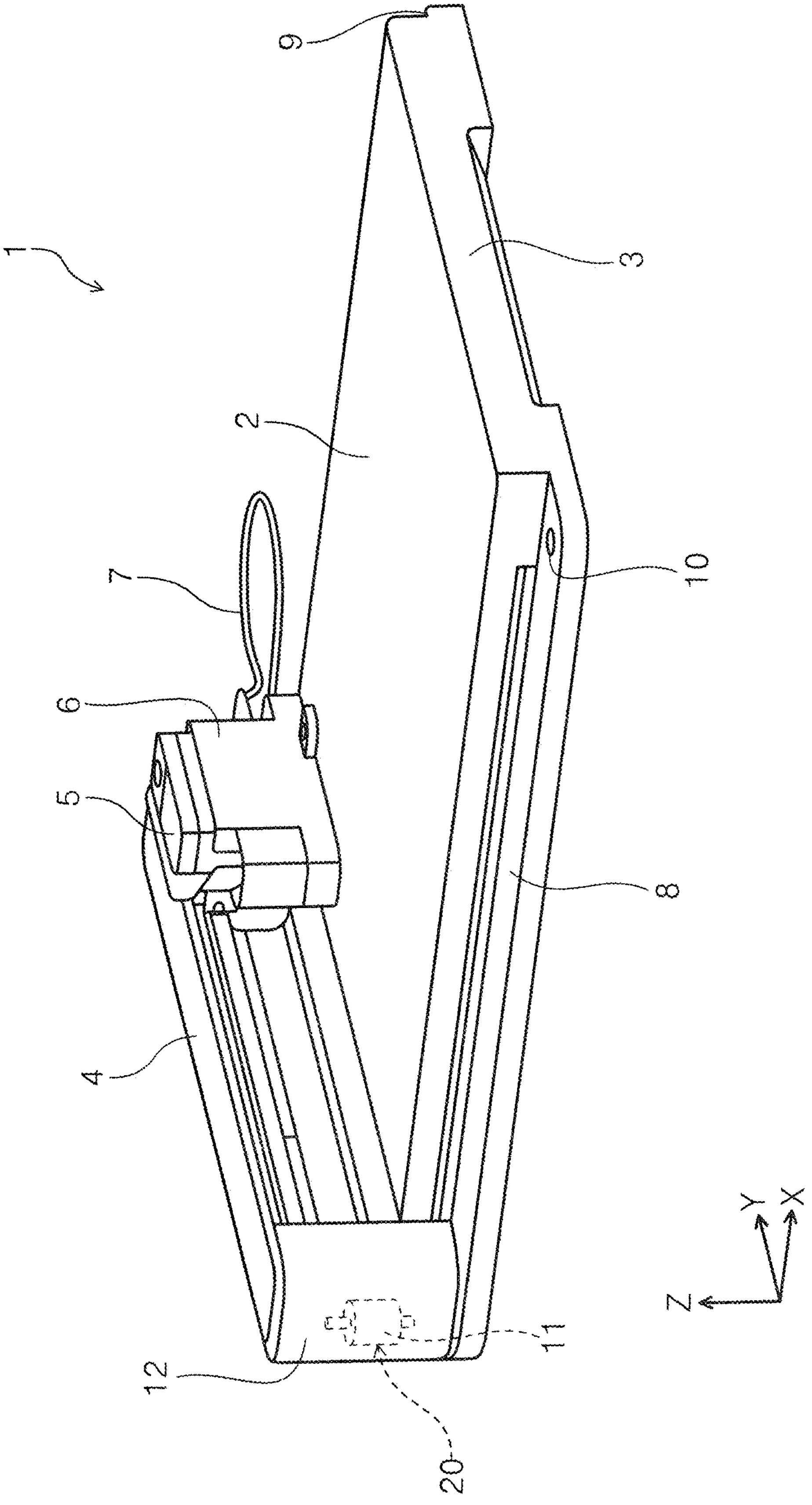
FIG. 1 is a perspective appearance view of a colorimeter device according to an embodiment as viewed from above.

Hereinafter, the present disclosure will be briefly described.

In order to solve the above-described problems, a drive device according to the first aspect of the present disclosure, includes a drive motor including a rotation shaft, a sensor unit including a slit disk in which is formed a plurality of slits and a sensor that detects the slits, and a holding member, wherein the slit disk is attached to the rotation shaft and the drive motor and the sensor are attached to the holding member.

Here, the "holding member held by the drive motor" means a state in which the holding member does not vibrate independently but vibrates integrally with the drive motor when the drive motor vibrates due to an impact.

According to this aspect, the drive motor, the slit disk, and the sensor are integrated by the holding member. By this, when the apparatus receives a drop impact, the drive motor, the slit disk, and the sensor vibrate integrally or synchronously. Therefore, it is possible to suppress the occurrence of misalignment among the drive motor, the slit disk, and the sensor.

A drive device according to a second aspect of the present disclosure is an aspect according to the first aspect, wherein the rotation shaft includes a first rotation shaft protruding from a first end face, which is one end of the drive motor, and a second rotation shaft protruding from a second end face, which is an other end of the drive motor, the drive motor is a cantilever structure fixed to a frame at the first end face, and the slit disk is attached to the second rotation shaft.

In the case where the drive motor has the cantilever structure as described above, the drop impact is structurally larger than that in the case of the both-end support structure. When the present disclosure is applied to an apparatus in which the drive motor has a cantilever structure, a large effect can be obtained.

A drive device according to a third aspect of the present disclosure is an aspect according to the second aspect, wherein the drive motor includes a first flange section that serves as a bearing of the first rotation shaft and a second flange section that serves as a bearing of the second rotation shaft, the holding member includes a chassis section along a shaft direction of the rotation shaft, a first extension section that extends from one end of the chassis section in a direction intersecting the shaft direction and that includes a first engaging section configured to engage with the first flange section, and a second extension section that extends from an other end of the chassis section in a direction intersecting the shaft direction and that includes a second engaging section configured to engage with the second flange section, and the first extension section is fixed to the frame in a state where the holding member is held by the drive motor.

According to this aspect, the holding member includes the chassis section, the first extension section having the first engaging section that engages with the first flange section, and the second extension section having the second engaging section that engages with the second flange section. In the holding member, the first extension section is fixed to the frame in a state where the first engaging section of the first extension section engages with the first flange section of the drive motor and the second engaging section of the second extension section engages with the second flange section of the drive motor, that is, in a state where the holding member is held by the drive motor.

By this, when the apparatus is subjected to a drop impact, the drive motor, the slit disk, and the sensor vibrate integrally in a more rigid state, and therefore the occurrence of misalignment of the drive motor, the slit disk, and the sensor can be further suppressed.

A drive device according to a fourth aspect of the present disclosure is an aspect according to the third aspect, wherein the first extension section is fixed to the one end of the chassis section by a screw, the first engaging section is a through hole into which the first flange section is inserted and engaged, and the second engaging section has a snap fit structure having an entry into which the second flange section can enter from a direction intersecting the shaft direction.

According to this aspect, the first extension section is fixed to the one end of the chassis section with a screw. In other words, the first extension section is configured as a separate structure that is separable from the chassis section and the second extension section. By this, the operation of engaging the first engaging section with the first flange section and the operation of engaging the second engaging section with the second flange section are easily performed.

The first engaging section is a through hole through which the first flange section is engaged, and the second engaging section has a snap fit structure having an entry into which the second flange section can enter from a direction intersecting the shaft direction. By this, due to the through hole and the snap fit structure, the operation of the engagement can be easily performed, and in addition, strong integration with the drive motor can be realized.

A colorimeter device according to a fifth aspect of the present disclosure includes the drive device according to the one of the first to fourth aspect, a colorimeter configured to measure a color of a measurement target, and a carriage supporting the colorimeter and configured to scan the colorimeter.

According to this aspect, it is possible to improve the tolerance of the colorimeter device at the time of a drop impact.

A drive device according to a sixth aspect of the present disclosure includes a first pulley, a second pulley, a timing belt stretched between the first pulley and the second pulley, a drive motor configured to drivingly rotate the first pulley, and a belt regulating section that regulates a shifting movement of the timing belt, wherein the belt regulating section has a regulating face formed along an outer peripheral surface of the timing belt at a position where the timing belt is stretched around the first pulley.

According to the present aspect, the belt regulating section includes the regulating face formed along the outer peripheral surface of the timing belt at a position where the timing belt is stretched around the first pulley. By this, even when a drop impact is applied, the regulating face regulates the displacement of the timing belt with respect to the first pulley. As a result, the timing belt can be prevented from dropping off the first pulley or the occurrence of tooth skipping.

A drive device according to a seventh aspect of the present disclosure is an aspect according to the sixth aspect, wherein the regulating face is present over a region of 180 degrees or more occupied by an arc section of the timing belt at a position of the first pulley.

Here, “existing over a region of 180 degree or more which is a portion of the arc of the timing belt at the position of the first pulley” means that the regulating face exists over a range of the outer peripheral surface of the arc in the region of the first pulley of the timing belt or more.

In the present aspect, the regulating face is present over a region of 180 degree or more occupied by the circular arc section of the timing belt at the position of the first pulley. By this, it is possible to effectively suppress dropping off the timing belt from the first pulley and the occurrence of tooth skipping.

A drive device according to a eighth aspect of the present disclosure is an aspect according to the seventh aspect, wherein the first pulley includes a shaft member, and a bearing that rotatably supports the shaft member and a frame to which the bearing is attached in a state of being inserted into an insert section are provided, the belt regulating section includes a first plate having the regulating face, a second plate that is positioned along a plate face of the first plate and that is fixed to the frame, and a joint plate section that couples the first plate and the second plate together.

According to the present aspect, the belt regulating section includes the first plate having the regulating face, the second plate fixed to the frame to which the bearing of the first pulley is attached, and the joint plate section coupling the first plate and the second plate. By this, it is possible to easily realize a structure in which the regulating face is disposed so as to be present over a region of 180 degree or more occupied by the arc section of the timing belt.

A drive device according to a ninth aspect of the present disclosure is an aspect according to the eighth aspect, the drive device further includes a detachment restriction section that restricts movement of the bearing in a direction in which the bearing detaches from the insert section.

A force may be applied to the bearing in a direction in which the bearing would detach from the insert section of the frame when the drop impact is received. According to the present aspect, the detachment restriction section restricts the movement of the bearing in a direction in which the bearing is detached from the insert section. By this, even when the apparatus receives impact from being dropped, it is possible to reduce the risk that the bearing detach from the insert section.

A drive device according to a tenth aspect of the present disclosure is an aspect according to the ninth aspect, wherein the detachment restriction section is provided on the second plate.

According to the present aspect, the detachment restriction section is provided on the second plate. That is, since the second plate, which is a component for fixing the belt regulating section to the frame, also has a function of regulating the detachment of the bearing, it is possible to achieve miniaturization without increasing the number of components.

A colorimeter device according to a eleventh aspect of the present disclosure includes the drive device according to the one of the sixth to tenth aspect, a colorimeter configured to measure the color of an object, a carriage configured to accommodate the colorimeter, and a gantry in which the carriage is movably attached and movable in a direction intersecting the moving direction of the carriage.

According to this aspect, it is possible to improve the tolerance of the colorimeter device at the time of a drop impact.

A drive device according to a twelfth aspect of the present disclosure is an aspect according to the sixth aspect, the drive device further includes a shaft member coupled to the first pulley and disposed in a direction along the rotation axis of the first pulley, a bearing that rotatably supports the shaft member, a frame to which the bearing is attached in a state of being inserted into an insert section, and a detachment restriction section that restricts movement of the bearing in a direction that the bearing detaches from the insert section.

According to the present aspect, it includes the detachment restriction section that restricts movement of the bearing in a direction in which the bearing is detached from the insert section of the frame. By this, even when a drop impact is applied, the bearing of the driving device can be prevented from dropping off from the frame.

A colorimeter device according to a thirteenth aspect of the present disclosure includes the drive device according to the twelfth aspect, a colorimeter configured to measure the color of an object, a carriage configured to accommodate the colorimeter, and a gantry in which the carriage is movably attached and movable in a direction intersecting the moving direction of the carriage.

According to the present aspect, it is possible to improve the tolerance of the colorimeter device at the time of a drop impact.

EMBODIMENTS

Hereinafter, embodiments of a drive device and a colorimeter device including the drive device according to the disclosure will be described in detail with reference to the drawings.

In the following description, three axes orthogonal to each other are referred to as an X-axis, a Y-axis, and a Z-axis, respectively, as shown in the drawings. The direction indicated by the arrows of the three axes (X, Y, Z) is the +direction of each direction, and the opposite direction is the −direction. The Z-axis direction corresponds to a vertical direction, that is, a direction in which gravity acts, a +Z direction indicates a vertically upward direction, and a −Z direction indicates a vertically downward direction. The X-axis direction and the Y-axis direction correspond to a horizontal direction. The +Y direction indicates the rear direction of the apparatus, and the −Y direction indicates the front direction of the apparatus. The +X direction indicates the right direction of the apparatus, and the −X direction indicates the left direction of the apparatus.

First, with reference to FIGS. 1 and 7, the entire structure of a colorimeter device 1 of the present embodiment will be described. The colorimeter device 1 includes a main body section 3 having a support base 2 extending in the X-axis direction and the Y-axis direction, and a gantry 4 extending in the Y-axis direction so as to cover a part of the support base 2 from the +Z direction side. A carriage 6 capable of accommodating a colorimeter 5 is attached to the gantry 4.

Figure 7:
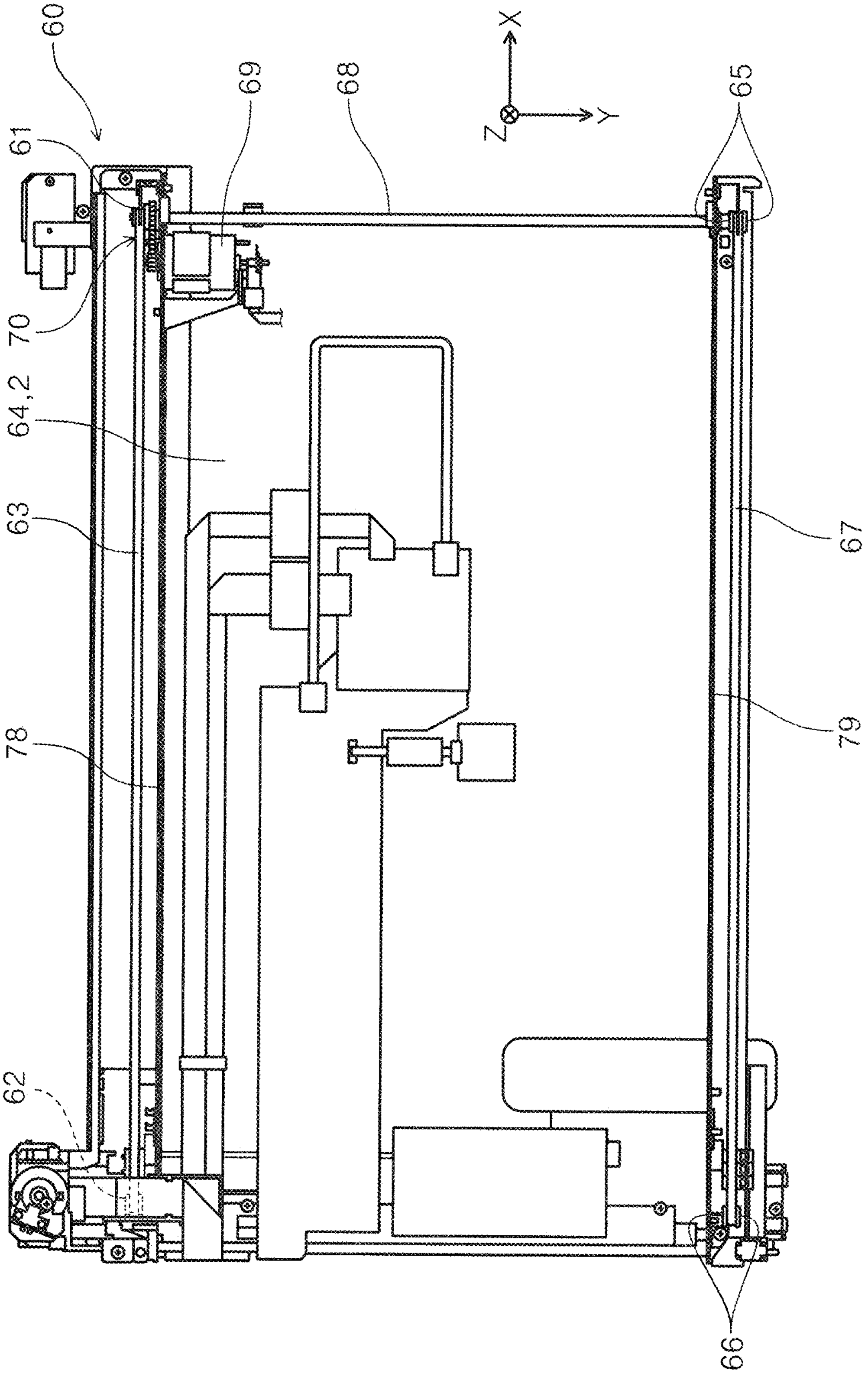
FIG. 7 is a schematic view of a colorimeter device support base according to the second and third embodiments as viewed from the bottom face.
Figure 8:
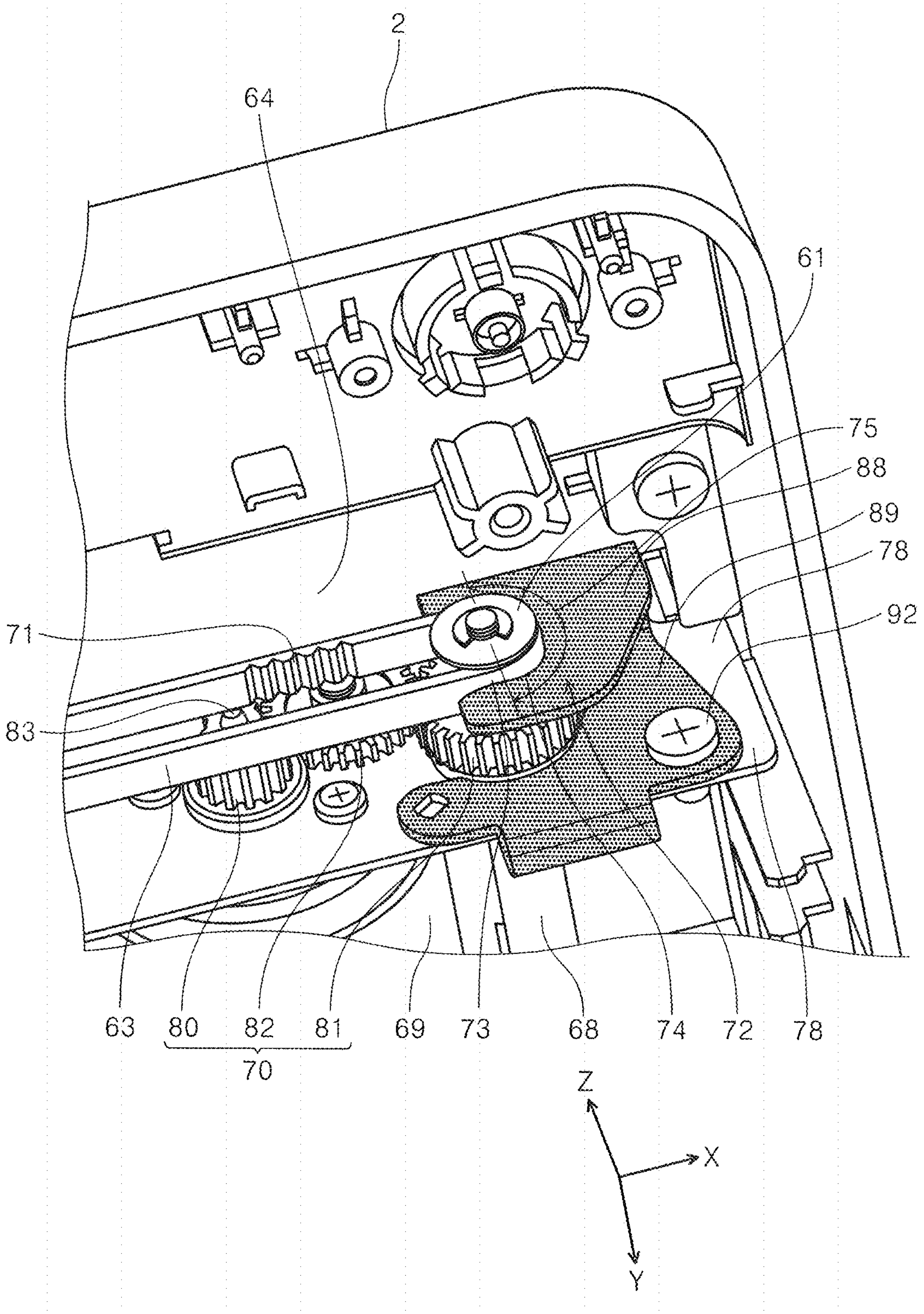
FIG. 8 is a main part perspective view of the drive device according to the second and third embodiments.

The gantry 4 is movable in the X-axis direction with respect to the support base 2 by a drive device 60 (shown in FIGS. 7 and 8). The carriage 6 is movable in the Y-axis direction with respect to the gantry 4 by a drive device 20 (shown in FIGS. 1 and 2). The carriage 6 is also movable in the Z-axis direction. These movements are also referred to as scanning. A drive motor 11 serving as a power source for moving the carriage 6 in the Y-axis direction with respect to the gantry 4 is provided at the end portion of the gantry 4 on the −Y direction side. The drive motor 11 will be further described later. In FIG. 1, the reference numeral 12 denotes an outer casing.

One end of an USB cable 7 is coupled to a processor (not shown). An other end of the USB cable 7 is coupled to the colorimeter 5 accommodated in the carriage 6.

A color chart (not shown), which is an example of an object to be measured, can be placed on the support base 2. The color chart includes, for example, a plurality of color patches, black frames, and the like. The color chart is fixed to the support base 2 by attaching, for example, an adhesive tape to the periphery of the color chart. A front face 8 is provided at a position lower than the support base 2 on the −Y direction side of the main body section 3, and a rear face 9 is provided at a position lower than the support base 2 on the +Y direction side of the main body section 3. A power button 10, which is an example of an operation unit of the colorimeter device 1, is provided on the front face 8.

First Embodiment

Next, the drive device 20 according to a first embodiment will be described with reference to FIGS. 2 to 6.

The drive device 20 of the present embodiment is provided with a drive motor 11 having a rotation shaft 21 and a sensor unit 25 having a slit disk 23, in which a plurality of slits 22 (shown in FIG. 3) are formed, and a sensor 24 for detecting the slits 22. Although the slits 22 are provided over the entire circumference of the slit disk 23, only some of the slits 22 are shown in FIG. 3 to simplify the drawing, and the remaining slits 22 are not shown. The slits 22 are not shown in FIGS. 2 and 4.

The drive device 20 further includes a holding member 26 that is held by the drive motor 11. That is, the holding member 26 is held in a state in which it vibrates integrally with the drive motor 11 when the drive motor 11 vibrates due to an impact such as a fall. In other words, the holding member 26 is integrated with the drive motor 11 to receive the impact of the fall or the like integrally, and it does not receive the impact independently from the drive motor 11.

In the state of the holding member 26 being held, the slit disk 23 is disposed on the rotation shaft 21 and the sensor 24 is disposed on the holding member 26.

Drive Motor

As described above, the drive motor 11 serves as a power source for moving the carriage 6 along the Y-axis direction with respect to the gantry 4.

Figure 2:
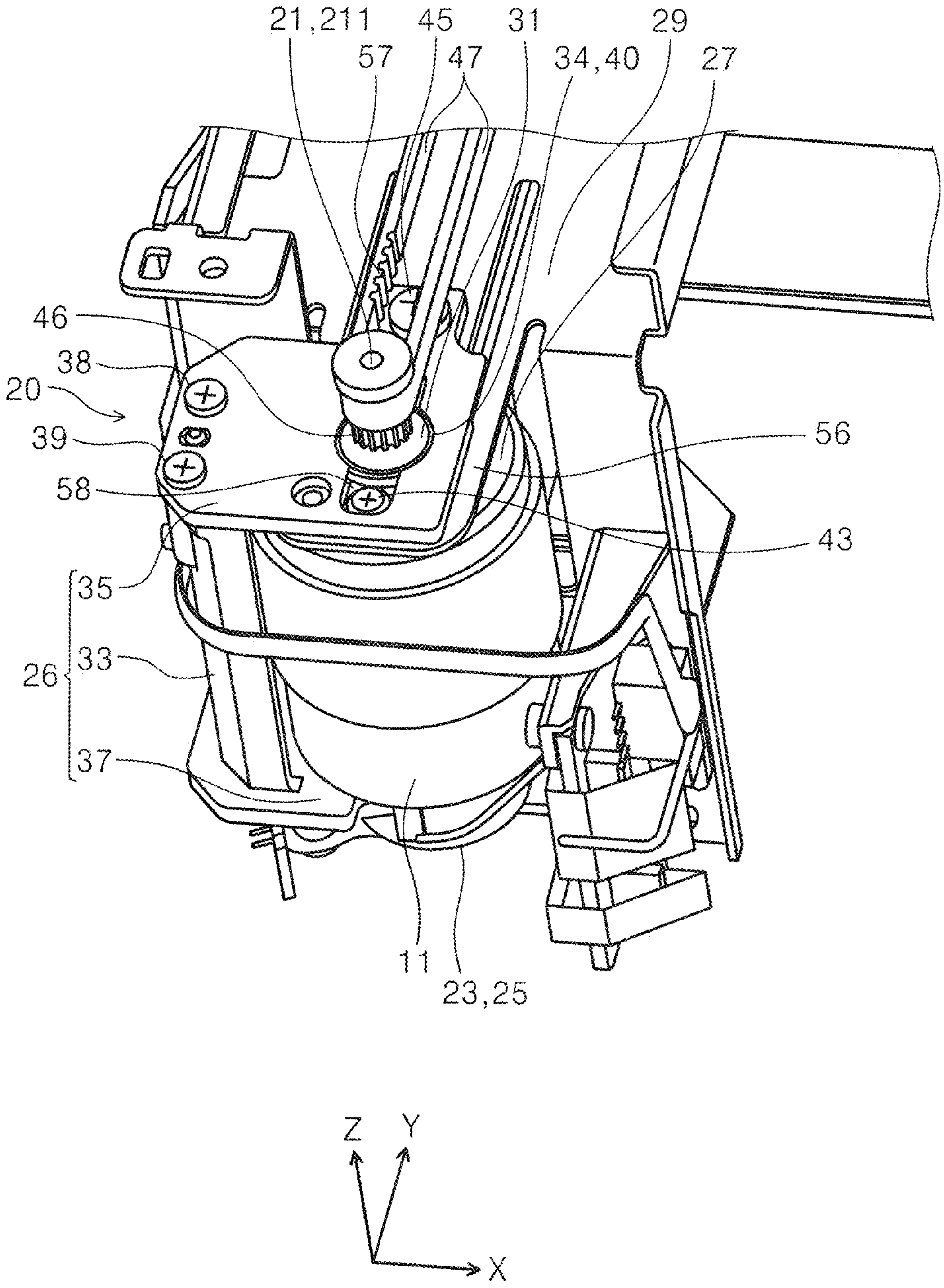
FIG. 2 is a perspective view showing the configuration of the drive device of the first embodiment as viewed from above.
Figure 3:
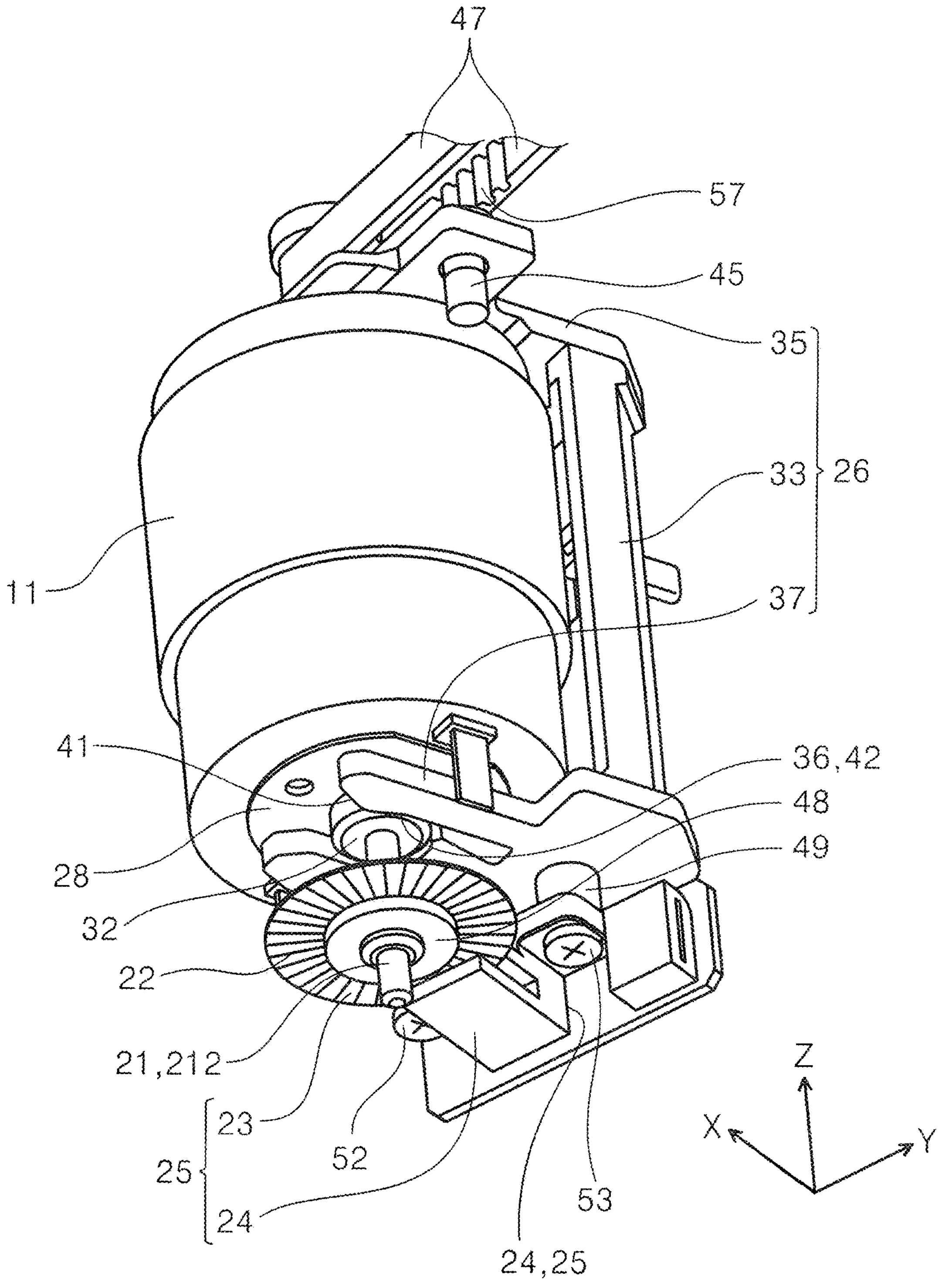
FIG. 3 is a perspective view showing the configuration of the drive device of the first embodiment as viewed from below.
Figure 4:
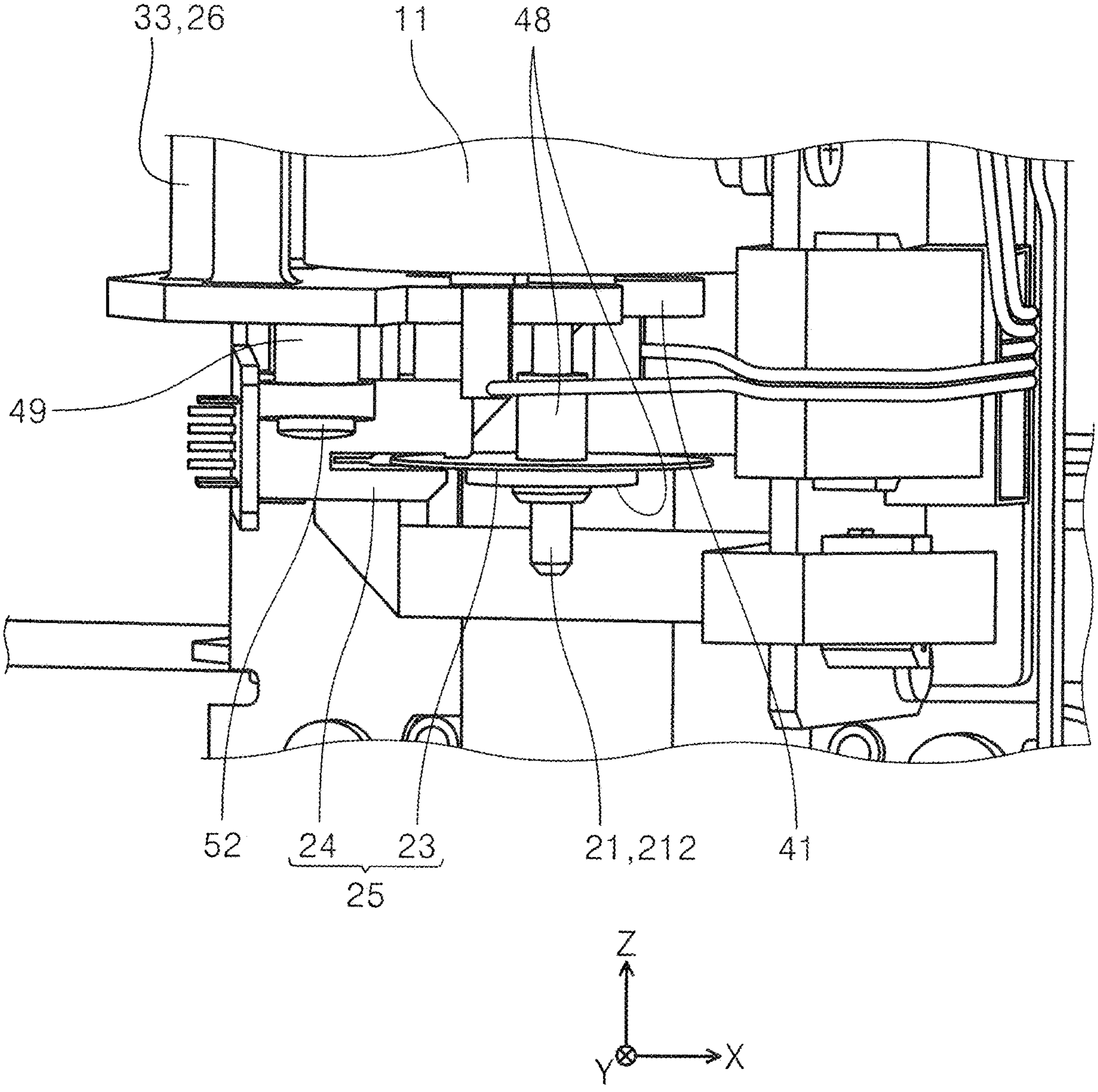
FIG. 4 is a main part side view of the drive device lower portion of the first embodiment.
Figure 5:
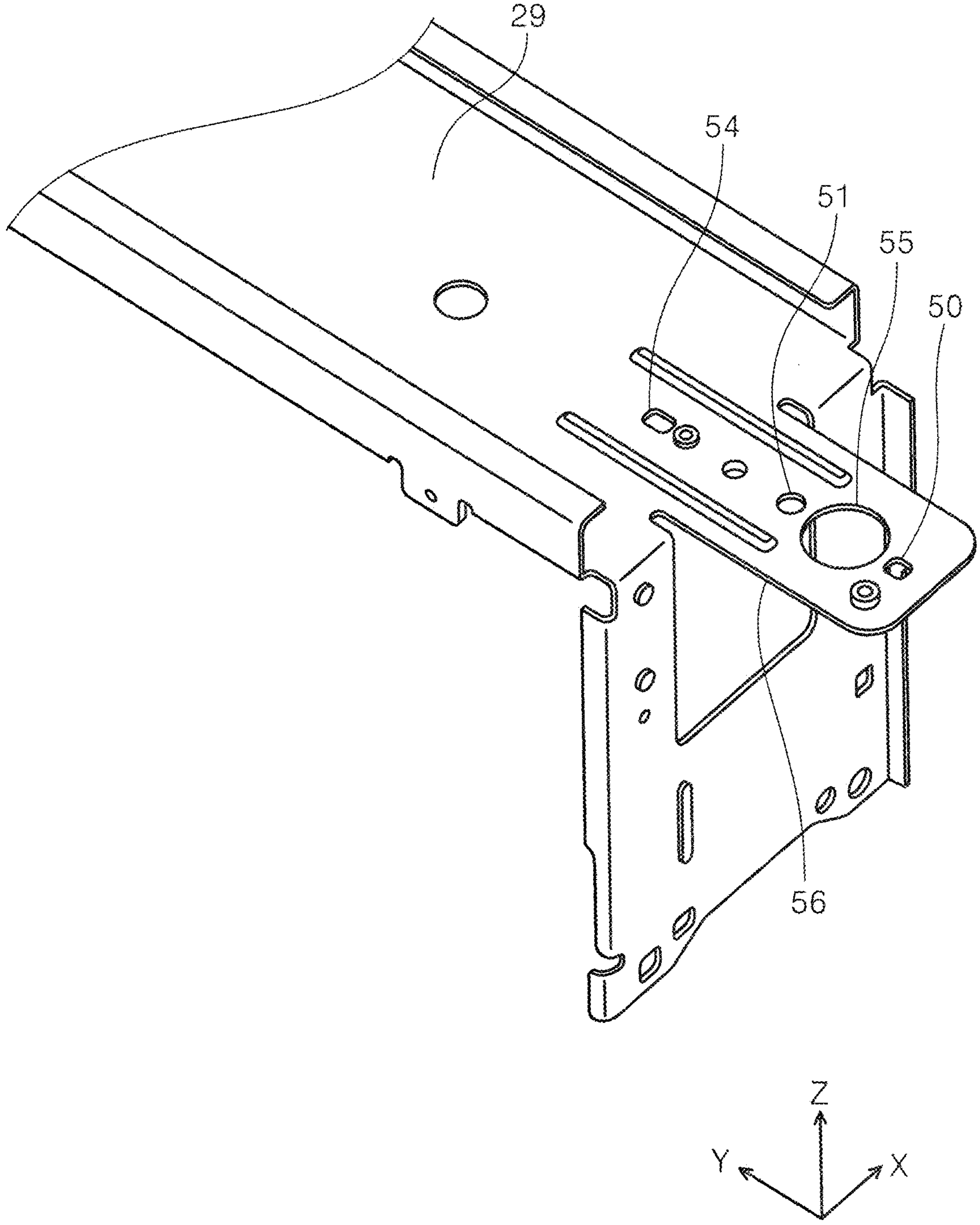
FIG. 5 is a main part perspective view of the frame of the first embodiment.
Figure 6:
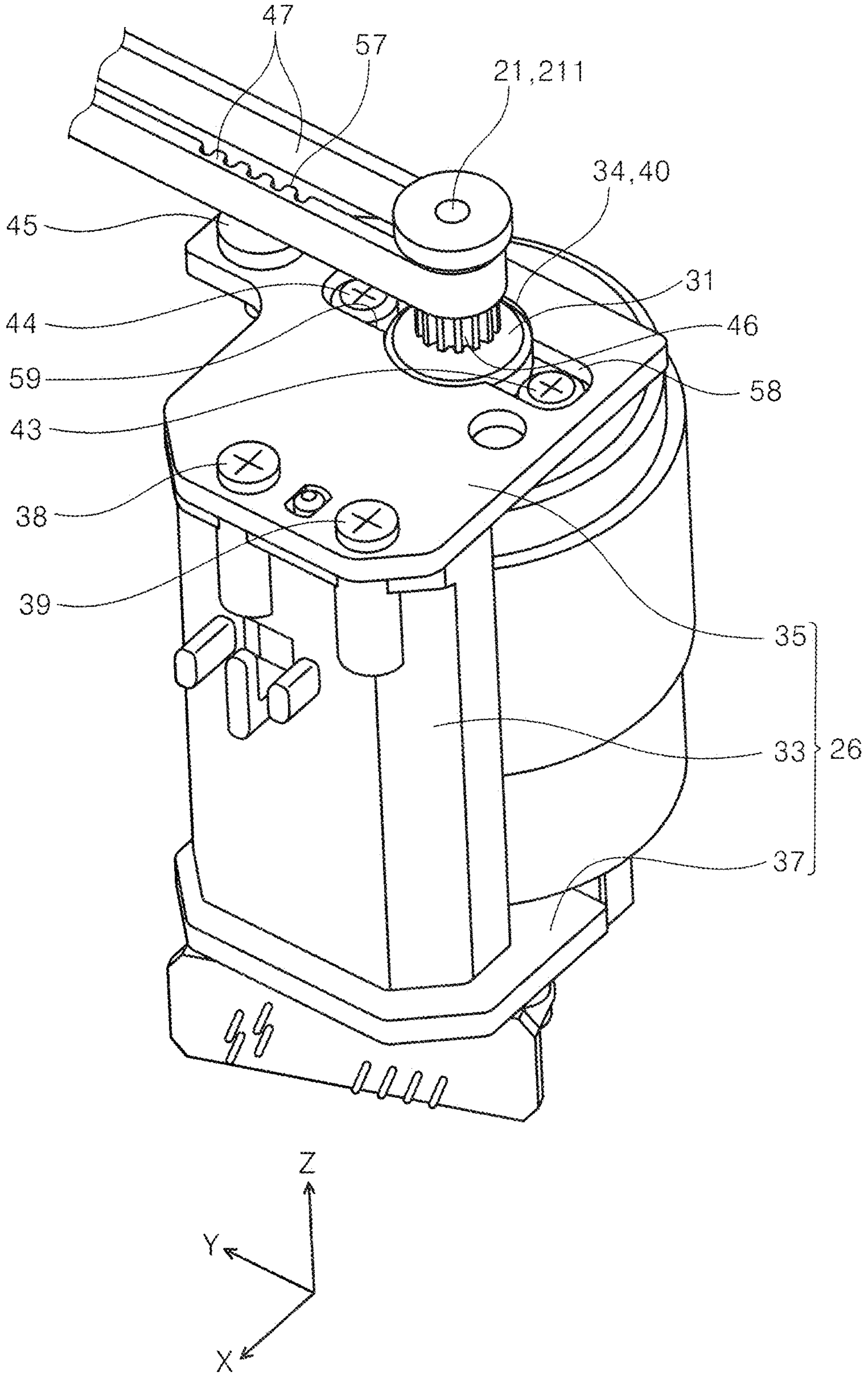
FIG. 6 is a perspective view showing the configuration of the drive device of the first embodiment as viewed from above, which is different from FIG. 2.

As shown in FIGS. 2 to 4, in the present embodiment, the drive motor 11 has, as the rotation shaft 21, a first rotation shaft 211 protruding upward from a first end face 27 of the drive motor 11 and a second rotation shaft 212 protruding downward from a second end face 28 of the drive motor 11. As shown in FIGS. 2, 5, and 6, the drive motor 11 is fixed to a motor fixing section 56 of a frame 29 on the first end face 27 by screws 43 and 44 (shown in FIG. 6). That is, the drive motor 11 is fixed in a cantilever structure and is positioned on the bottom face of the motor fixing section 56 of the frame 29. Specifically, as shown in FIG. 5, through holes 50 and 51 are formed in the motor fixing section 56. The drive motor 11 is fastened and fixed to the bottom face of the motor fixing section 56 by inserting the screws 43 and 44 into the through holes 50 and 51, respectively, from the upper face side to the bottom face side of the motor fixing section 56 and screwing the screws 43 and 44 into the first end face 27 of the drive motor 11.

The slit disk 23 is disposed on the second rotation shaft 212. Further, the drive motor 11 has a first flange section 31 serving as a bearing of the first rotation shaft 211 and a second flange section 32 serving as a bearing of the second rotation shaft 212.

As shown in FIG. 5, the motor fixing section 56 of the frame 29 is formed with a through hole 55 through which the first flange section 31 can pass. The drive motor 11 is fixed to the motor fixing section 56 in a state where the first flange section 31 passes through the through hole 55 from the bottom face side to the upper face side of the motor fixing section 56 and protrudes upward. In FIGS. 3 and 6, the frame 29 is not shown to facilitate understanding of the drawings.

As described above, the drive motor 11 is disposed at the end section on the −Y direction side in the Y-axis direction of the gantry 4 (shown in FIG. 1). A pinion 46 is attached to the first rotation shaft 211 of the drive motor 11. A toothed pulley (not shown) is disposed at the end of the gantry 4 on the +Y direction side in the Y-axis direction. An endless toothed timing belt 47 is stretched between the pinion 46 positioned on the −Y direction side and the toothed pulley positioned on the +Y direction side, that is, spans between them in a tensioned state.

By this, the rotation of the drive motor 11 is transmitted from the pinion 46 to the timing belt 47 and the timing belt 47 moves to circulate, whereby the carriage 6 moves in the Y-axis direction with respect to the gantry 4. Although teeth 57 of the timing belt 47 are provided over the entire timing belt 47, only some of the teeth 57 is described here, and the description of the remaining teeth is omitted.

Holding Member

As shown in FIGS. 2, 3, and 6, the holding member 26 includes a chassis section 33 extending along the shaft direction (Z-axis direction) of the rotation shaft 21, a first extension section 35 that extends from one end of the chassis section 33 in a direction (X-axis direction) intersecting the shaft direction (Z-axis direction) and that has a first engaging section 34 engaging with the first flange section 31, and a second extension section 37 that extends from the other end of the chassis section 33 in a direction (X-axis direction) intersecting the shaft direction (Z-axis direction) and that has a second engaging section 36 engaging with the second flange section 32.

As shown in FIG. 2, in a state where the holding member 26 is held by the drive motor 11, the holding member 26 is fixed by a screw 45 such that the bottom face of the first extension section 35 is in contact with the upper face of the frame 29. That is, the holding member 26 is configured such that the first extension section 35 is fixed to the frame 29 by the screw 45 in a state where the first engaging section 34 of the first extension section 35 is engaged with the first flange section 31 of the drive motor 11 and the second engaging section 36 of the second extension section 37 is engaged with the second flange section 32 of the drive motor 11. In FIG. 5, reference numeral 54 denotes a through hole through which the screw 45 passes.

Sensor Unit

As described above, the sensor unit 25 is constituted by a pair of the slit disks 23 in which the plurality of slits 22 (shown in FIG. 3) are formed and the sensor 24 that detects the slits 22. The sensor unit 25 senses the amount of rotation of the drive motor 11 by counting the slits 22 of the rotating slit disk 23 with the sensor 24.

As shown in FIGS. 3 and 4, the slit disk 23 is attached to the second rotation shaft 212 of the drive motor 11 via a holder 48 so as to rotate integrally with the second rotation shaft 212. On the other hand, the sensor 24 is attached to a holding member 26. Specifically, the sensor 24 is fixed to two protruding cylinders 49 provided at two positions of the second extension section 37 of the holding member 26 by screws 52 and 53.

In the present embodiment, as shown in FIGS. 2 and 6, the holding member 26 is integrated with the chassis section 33 by using screws 38 and 39 to fix the first extension section 35 to the upper end, which is one end of the chassis section 33. The first engaging section 34 is formed by a through hole 40 into which the first flange section 31 is inserted and engaged. In the present embodiment, in the first extension section 35, exposing holes 58 and 59, which expose the screws 43 and 44 positioned on both sides of the through hole 40 in the Y-axis direction, are formed to be continuous with the through hole 40. The exposing holes 58 and 59 are connected to the through hole 40.

On the other hand, as shown in FIG. 3, the second engaging section 36 of the second extension section 37 of the holding member 26 is constituted by a substantially U-shaped snap fit structure 42 having an entry 41 into which the second flange section 32 can enter from a direction (+X direction) intersecting the shaft direction (Z-axis direction). The chassis section 33 and the second extension section 37 are integrally formed of resin material.

Description of Effects of First Embodiment

1. In the present embodiment, the drive motor 11, the slit disk 23, and the sensor 24 are integrated by the holding member 26. By this, when the apparatus receives a drop impact, the drive motor 11, the slit disk 23, and the sensor 24 vibrate integrally or synchronously. Accordingly, it is possible to suppress the occurrence of arrangement deviation among the drive motor 11, the slit disk 23, and the sensor 24.

2. In the case where the drive motor 11 has the cantilever structure, the drop impact is structurally larger than that in the case of the both-end support structure. The present embodiment is applied to an apparatus in which the drive motor 11 has a cantilever structure, and thus the obtained effect is large.

3. In the present embodiment, the holding member 26 includes a chassis section 33, the first extension section 35 having the first engaging section 34 that engages with the first flange section 31, and the second extension section 37 having the second engaging section 36 that engages with the second flange section 32. Further, in the holding member 26, the first extension section 35 is fastened and fixed to the frame 29 in a state where the first engaging section 34 of the first extension section 35 engages with the first flange section 31 of the drive motor 11 and the second engaging section 36 of the second extension section 37 engages with the second flange section 32 of the drive motor 11, that is, in a state where the holding member 26 is held by the drive motor 11. By this, when the apparatus is subjected to a drop impact, the drive motor 11, the slit disk 23, and the sensor 24 vibrate integrally in a firmer state, whereby the occurrence of misalignment among the drive motor 11, the slit disk 23, and the sensor 24 can be further suppressed.

4. In the present embodiment, the first extension section 35 is fixed at one end of the chassis section 33 by the screws 38 and 39. That is, the first extension section 35 is configured as a separate structure separable from the chassis section 33 and the second extension section 37. By this, the operation of engaging the first engaging section 34 with the first flange section 31 and the operation of engaging the second engaging section 36 with the second flange section 32 can be easily performed.

The first engaging section 34 is the through hole 40 through which the first flange section 31 passes and engages, and the second engaging section 36 is the snap fit structure 42 having the entry 41 into which the second flange section 32 can enter from a direction (X-axis direction) intersecting the shaft direction (X-axis direction) of the rotation shaft 21. By this, that is, by the through hole 40 and the snap fit structure 42, it is possible to realize strong integration with the drive motor 11 in addition to ease of performing the engagement work.

5. In the colorimeter device of the present embodiment, the tolerance of the colorimeter device at the time of drop impact can be improved by the above-described structure of the drive device 20.

Second Embodiment

Next, the drive device 60 according to a second embodiment will be described with reference to FIGS. 7 to 12. The same parts as those in the first embodiment are denoted by the same reference numerals, and the description of the configuration and the corresponding effects will be omitted.

As shown in FIG. 7, the drive device 60 of the present embodiment is provided on a bottom face 64 of the support base 2. The drive device 60 includes a first pulley 61, a second pulley 62, and a timing belt 63. The timing belt 63 is an endless toothed belt stretched between the first pulley 61 and the second pulley 62. The first pulley 61 is positioned at an end portion in the +X direction and an end portion in the −Y direction of the support base 2. The second pulley 62 is positioned at an end portion in the −X direction and at an end portion in the −Y direction of the support base 2.

In the present embodiment, the drive device 60 further includes a third pulley 65, a fourth pulley 66, and a timing belt 67. The third pulley 65 is positioned at an end portion in the +X direction and an end portion in the +Y direction of the support base 2. The fourth pulley 66 is positioned at an end portion in the −X direction and an end portion in the +Y direction of the support base 2.

Shaft Member and Bearing

Figure 11:
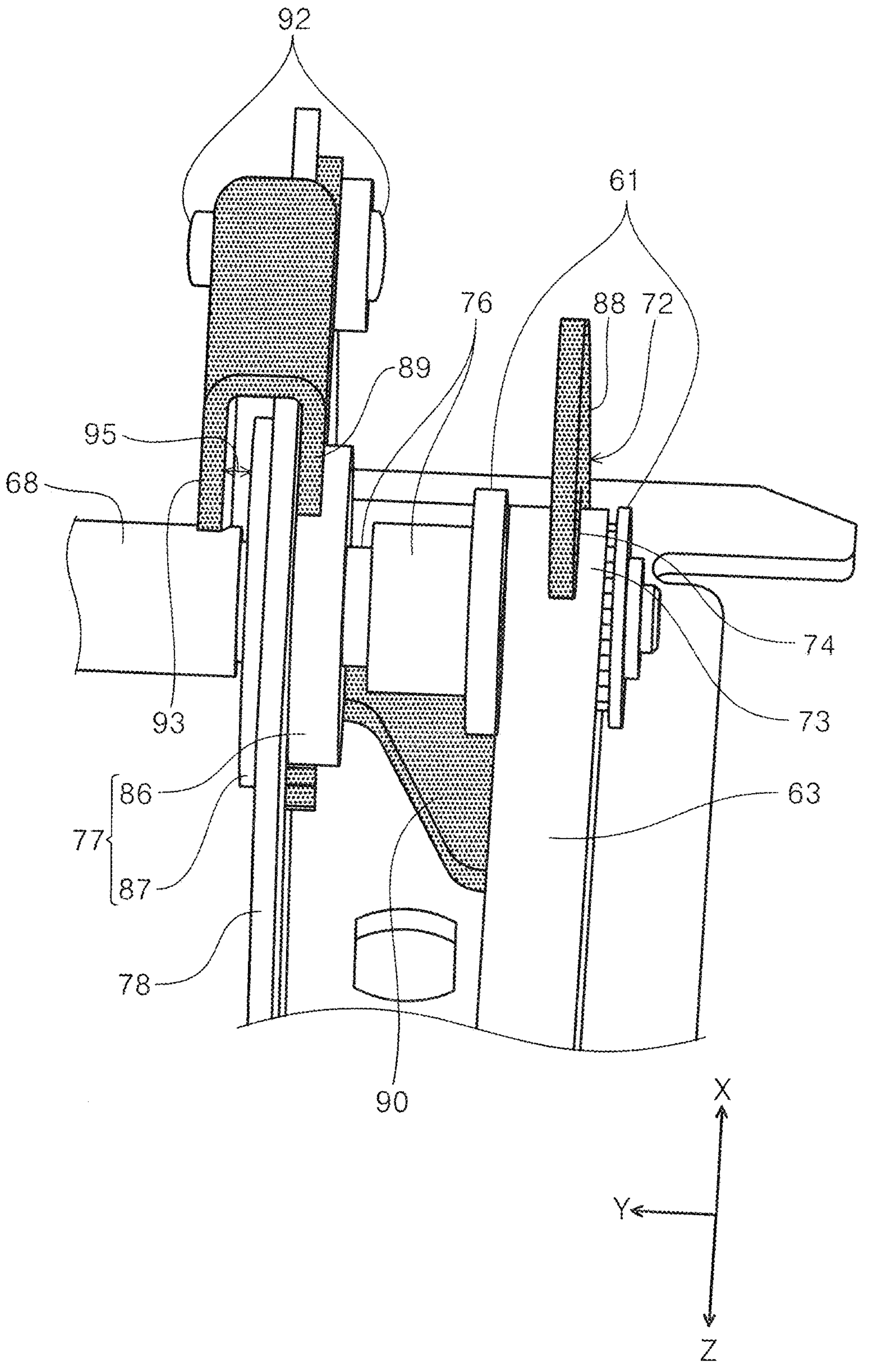
FIG. 11 is a perspective view of a main part of a drive device of the second and third embodiments.
Figure 12:
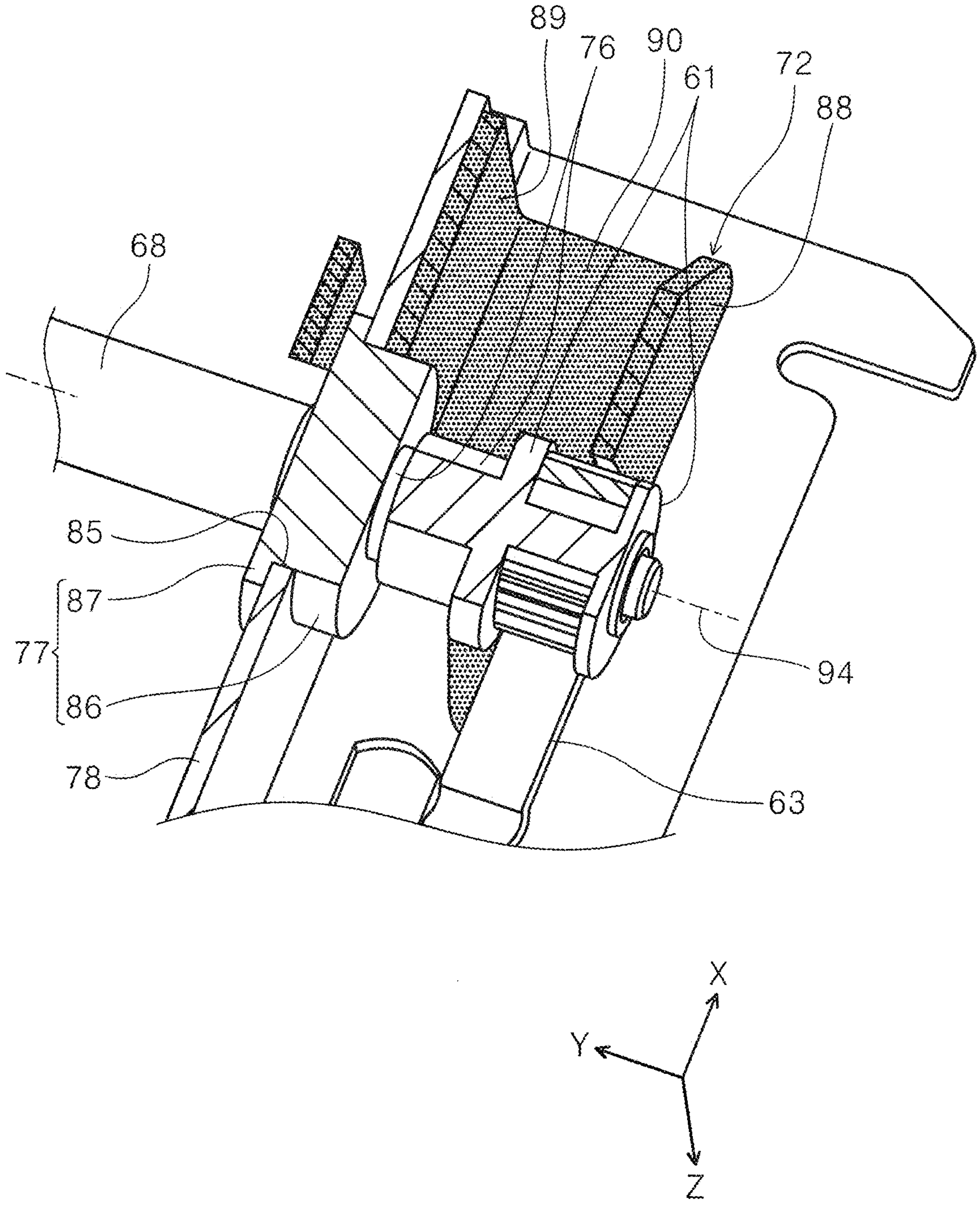
FIG. 12 is a partial cross-sectional perspective view of a main part of the drive device according to the second and third embodiments.

As shown in FIGS. 11 and 12, the first pulley 61 has a shaft member 76 and is rotatably supported by a bearing 77 attached to a frame 78. The bearing 77 is inserted into and attached to an insert section 85 (shown in FIG. 12) of the frame 78. Like the first pulley 61, the third pulley 65 has a shaft member (not shown) and is rotatably supported by a bearing (not shown) attached to a frame 79 (shown in FIG. 7). The first pulley 61 is rotationally driven by the power transmitted from a drive motor 69 via a gear train 70.

As shown in FIG. 8, the gear train 70 includes a pinion 80 attached to a rotation shaft 83 of the drive motor 69, a first gear 81 attached to the shaft member 76 of the first pulley 61, and a second gear 82, which is a transmission gear that transmits the rotation of the pinion 80 to the first gear 81. In FIGS. 11 and 12, the gear train 70 is not shown.

In this embodiment, the bearing 77 comprises a cylindrical insert section 86 and a flange section 87 with a diameter larger than that of the insert section 86. The bearing 77 is inserted into the insert section 85 from the +Y side toward the −Y side, and is attached in a state where the flange section 87 is in contact with the surface of the frame 78 on the +Y side.

As shown in FIGS. 7, 11, and 12, the shaft member 76 of the first pulley 61 and the shaft member of the third pulley 65 are coupled to each other by a coupling shaft 68 to rotate integrally. When the first pulley 61 is rotated by power transmitted from the drive motor 69 via the gear train 70, the coupling shaft 68 is rotated, and thus the third pulley 65 is also rotated integrally. By integrally rotating the first pulley 61 and the third pulley 65, the timing belts 63 and 67 circulate at the same moving speed.

The gantry 4 moves in the X-axis direction with respect to the support base 2 by the circulating movement of the timing belts 63 and 67. Although teeth 71 of the timing belts 63 and 67 are provided all over the timing belts 63 and 67, only some of the teeth 71 are shown here, and the description of the remaining teeth is omitted.

Belt Regulating Section

Figure 9:
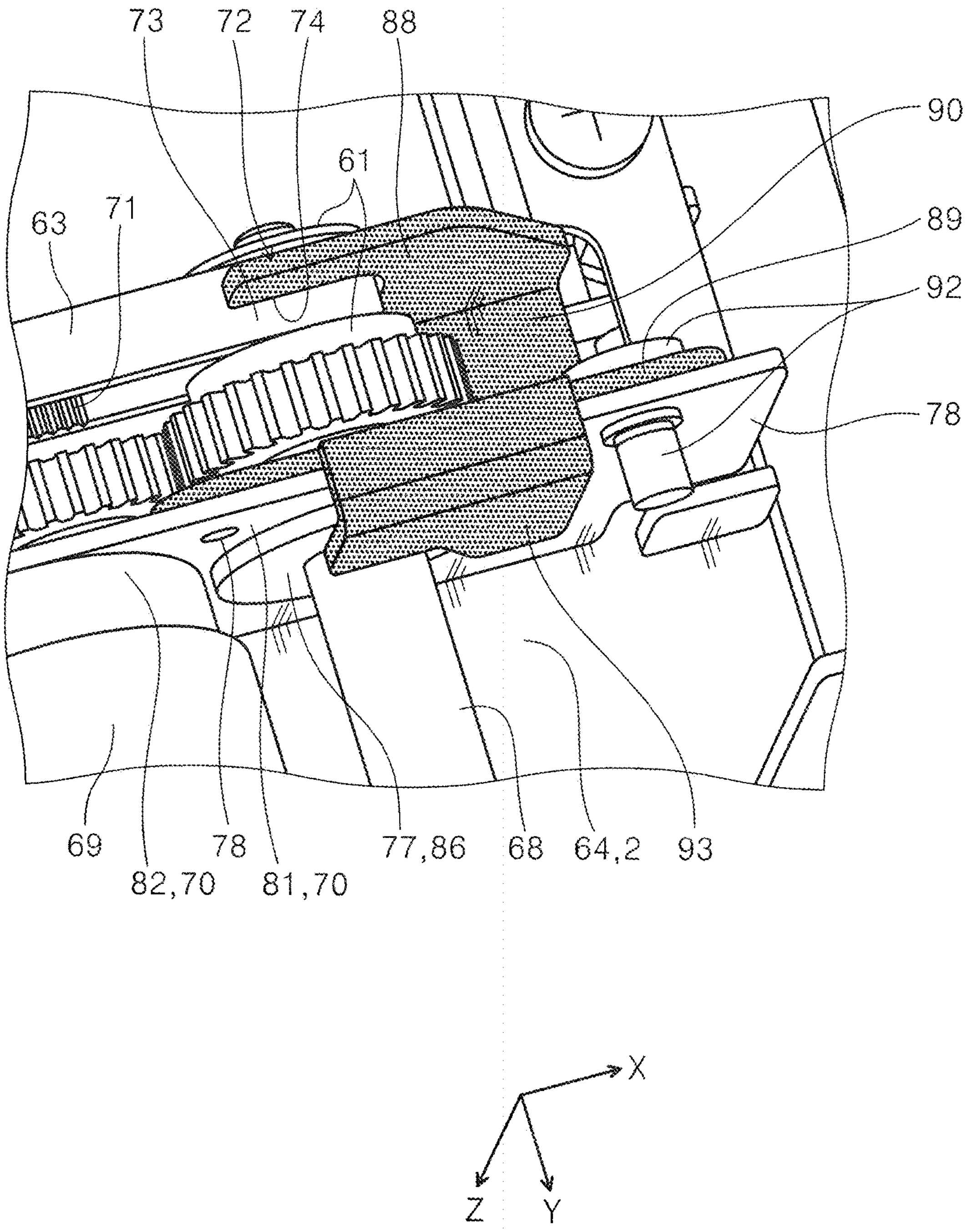
FIG. 9 is a main part perspective view of the drive device according to the second and third embodiments.

As shown in FIGS. 8 and 9, in the present embodiment, the drive device 60 includes a belt regulating section 72 for regulating the shifting movement of the timing belt 63. The belt regulating section 72 has a regulating face 74 formed along an outer peripheral surface 73 of the timing belt 63 at a position where the timing belt 63 is stretched around the first pulley 61.

Figure 10:
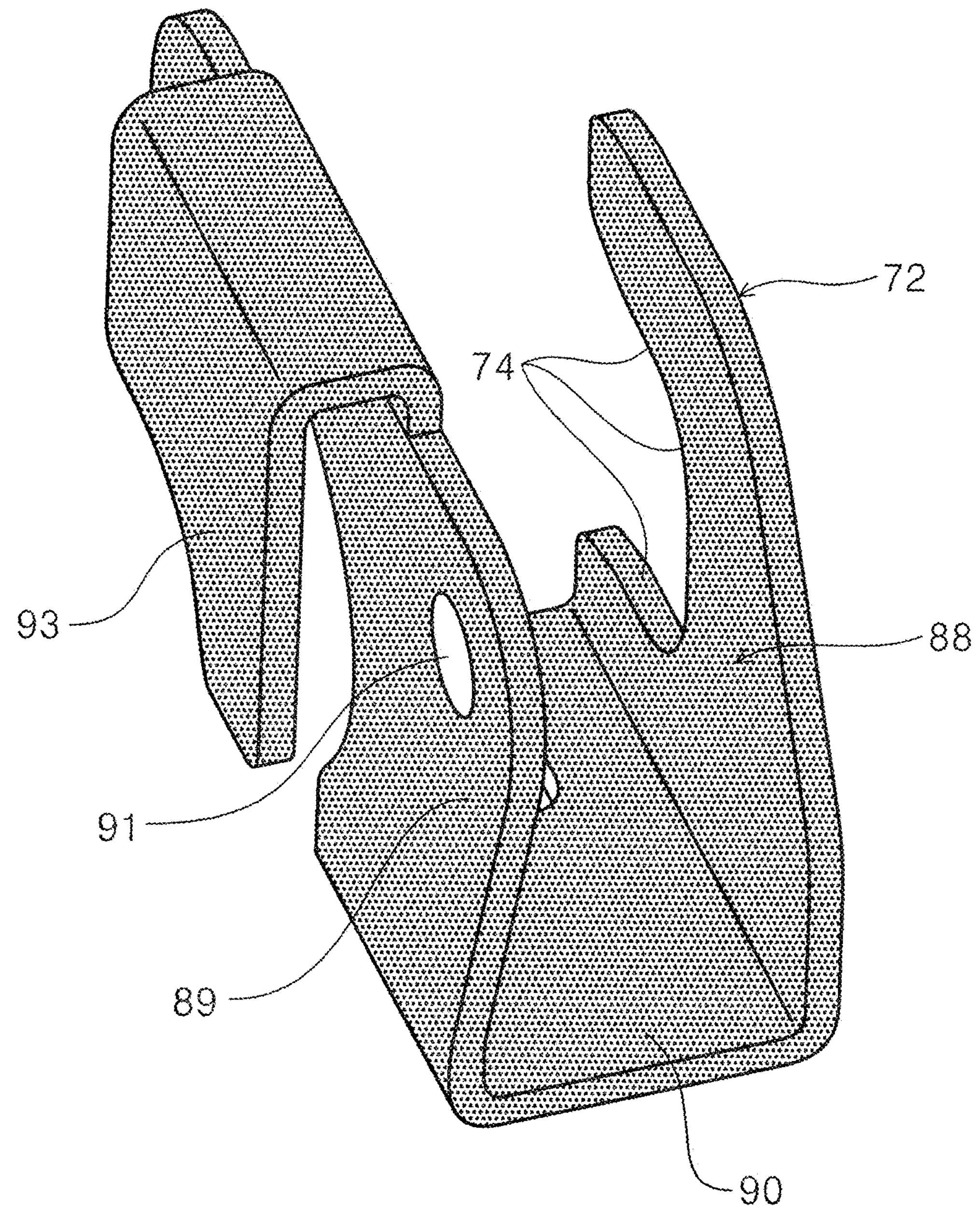
FIG. 10 is an overall perspective view of a belt regulating section and a detachment restriction section of the second and third embodiments.

As shown in FIG. 10, in this embodiment, the regulating face 74 is formed in a substantially U-shape so as to be present over a region 75 (shown in FIG. 8) of 180 degrees or more occupied by the circular arc section of the timing belt 63 at the position of the first pulley 61. Although it is desirable that the regulating face 74 be present over the region 75 of 180 degree or more, the regulating face 74 may be configured to be present in the region 75 of 180 degree or less depending on a design specification or the like.

In the present embodiment, as shown in FIG. 10, the belt regulating section 72 includes a first plate 88 having the regulating face 74, a second plate 89 positioned along the plate surface of the first plate 88 and fixed to the frame 78, and a joint plate section 90 coupling the first plate 88 and the second plate 89. The second plate 89 has a through hole 91 formed therein, and is fixed to the frame 78 by a screw 92. That is, the regulating face 74 of the first plate 88 is designed to, by fixing the second plate 89 to the frame 78 by the screw 92, exist in the region 75 of 180 degree occupied by the circular arc section of the timing belt 63. In other words, the regulating face 74 of the first plate 88 is designed to, by fixing the second plate 89 to the frame 78, exist at a position where the regulating face 74 regulates the shifting movement of the timing belt 63 at the time of the drop impact.

Detachment Restriction Section

As shown in FIGS. 9 to 11, the present embodiment further includes a detachment restriction section 93 that restricts movement of the bearing 77 in a direction (+Y direction) in which the bearing 77 would detach from the insert section 85. The detachment restriction section 93 is provided on the second plate 89 in the shape shown in FIG. 10. The first plate 88, the second plate 89, the joint plate section 90, and the detachment restriction section 93 are integrally formed of resin material.

In the present embodiment, the structure is such that the bearing 77 slips out in the +Y direction, but does not slip out in the −Y direction due to the flange section 87. Therefore, the detachment restriction section 93 is provided only on the side of the flange section 87. The detachment restriction section 93 has the flange section 87 and a gap section 95 and is provided on there. The gap section 95 allows the bearing 77 to move slightly in the Y-axis direction.

Description of Effects of Second Embodiment

1. In the present embodiment, the belt regulating section 72 has the regulating face 74 formed along the outer peripheral surface 73 of the timing belt 63 at a position where the timing belt 63 is stretched around the first pulley 61. By this, even when a drop impact is applied, the regulating face 74 regulates the shifting movement of the timing belt 63 with respect to the first pulley 61. Thus, it is possible to suppress the timing belt 63 from dropping off the first pulley 61 and the occurrence of tooth skipping.

2. In addition, in the embodiment, the regulating face 74 is present over the region 75 of 180 degree or more, which is occupied by the circular arc portion of the timing belt 63 at the position of the first pulley 61. By this, it is possible to effectively suppress the timing belt 63 from dropping off the first pulley 61 and the occurrence of tooth skipping.

3. In this embodiment, the belt regulating section 72 includes the first plate 88 having the regulating face 74, the second plate 89 fixed to the frame 78 to which the bearing 77 of the first pulley 61 is attached, and the joint plate section 90 coupling the first plate 88 and the second plate 89. By this, it is possible to easily realize a structure in which the regulating face 74 is disposed to be present over the region 75 of 180 degree or more occupied by the circular arc portion of the timing belt 63.

4. In the present embodiment, when the bearing 77 receives a drop impact, a force may be applied to the bearing 77 in a direction (+Y direction) in which the bearing 77 detaches from the insert section 85 of the frame 78. According to the present embodiment, the detachment restriction section 93 restricts the movement of the bearing 77 in the direction of detachment from the insert section 85. By this, even when the apparatus is received drop impact, it is possible to reduce the risk that the bearing 77 detaches from the insert section 85.

5. In the present embodiment, the detachment restriction section 93 is provided on the second plate 89. That is, since the second plate 89, which is a component for fixing the belt regulating section 72 to the frame 78, also has the function of regulating the bearing 77 from detaching, it is possible to achieve miniaturization without increasing the number of components.

6. In the colorimeter device according to the present embodiment, the tolerance of the colorimeter device at the time of a drop impact can be improved by the drive device 60.

Third Embodiment

The drive device of the third embodiment includes, as main components, the bearing 77 and the detachment restriction section 93 according to the drive device 60 of the second embodiment. The second embodiment is different from the third embodiment in that the regulating face 74 and the first plate 88 having the regulating face 74 in the second embodiment are removed from the components of the third embodiment. Therefore, the third embodiment will be described using the same drawings and reference numerals as those of the second embodiment.

As shown in FIGS. 7 and 9 to 12, the drive device 60 according to the third embodiment includes the first pulley 61, the second pulley 62, and the timing belt 63 stretched between the first pulley 61 and the second pulley 62. It includes the shaft member 76 (shown in FIGS. 11 and 12) coupled to the first pulley 61 and disposed in a direction (X-axis direction) along a rotation axis 94 (shown in FIG. 12) of the first pulley 61, the bearing 77 rotatably supporting the shaft member 76, and a frame 78 attached in a state where the bearing 77 is inserted into the insert section 85. The detachment restriction section 93 is provided to restrict movement of the bearing 77 in a direction (+Y direction) in which the bearing 77 detach from the insert section 85. The other components are the same as those of the second embodiment, and thus, the description thereof will be omitted.

Description of Effects of Third Embodiment

1. According to the present embodiment, the drive device 60 includes the detachment restriction section 93 that restricts the movement of the bearing 77 in the direction in which it would detach from the insert section 85 of the frame 78. By this, even when a drop impact is applied, the bearing 77 can be prevented from dropping off from the frame 78.

2. In the colorimeter device according to the present embodiment, the tolerance of the colorimeter device at the time of a drop impact can be improved by the drive device 60.

OTHER EMBODIMENTS

The drive devices 20 and 60 and the colorimeter device 1 according to the present disclosure basically have the configurations of the embodiments described above, but it is of course possible to change or omit a partial configuration without departing from the gist of the disclosure of the present application.

In the first embodiment, the apparatus including the drive devices 20 and 60 has been described as a colorimeter device. However, the apparatus is not limited to the colorimeter device, and may be an apparatus other than the colorimeter device as long as it is possible to improve the tolerance to a drop impact.

In addition, in the second embodiment, the case in which the belt regulating section 72 is disposed at the portion of the first pulley 61 has been described, but the belt regulating section 72 may be disposed at any position or at all positions of the second pulley 62, the third pulley 65, and the fourth pulley 66.

What is claimed is:

1. A drive device comprising:
a drive motor including a rotation shaft, the rotation shaft comprising:
a first rotation shaft protruding from a first end face, which is one end of the drive motor, and
a second rotation shaft protruding from a second end face, which is an other end of the drive motor;
a sensor unit including a slit disk in which is formed a plurality of slits and a sensor that detects the slits; and
a holding member, wherein
the slit disk is attached to the rotation shaft,
the drive motor and the sensor are attached to the holding member,
the drive motor is a cantilever structure fixed to a frame at the first end face,
the slit disk is attached to the second rotation shaft,
the drive motor includes
a first flange section that serves as a bearing of the first rotation shaft and
a second flange section that serves as a bearing of the second rotation shaft, the holding member includes
a chassis section along a shaft direction of the rotation shaft, a first extension section that extends from one end of the chassis section in a direction intersecting the shaft direction and that includes a first engaging section configured to engage with the first flange section, and
a second extension section that extends from an other end of the chassis section in a direction intersecting the shaft direction and that includes a second engaging section configured to engage with the second flange section, and
the first extension section is fixed to the frame in a state where the holding member is held by the drive motor.

2. The drive device according to claim 1, wherein
the first extension section is fixed to the one end of the chassis section by a screw,
the first engaging section is a through hole into which the first flange section is inserted and engaged, and
the second engaging section has a snap fit structure having an entry into which the second flange section can enter from a direction intersecting the shaft direction.

3. A colorimeter device comprising:
the drive device according to claim 1;
a colorimeter configured to measure a color of a measurement target; and
a carriage supporting the colorimeter and configured to move the colorimeter.

4. A drive device comprising:
a first pulley;
a second pulley;
a timing belt stretched between the first pulley and the second pulley;
a drive motor configured to drivingly rotate the first pulley; and
a belt regulating section that regulates a shifting movement of the timing belt, wherein
the belt regulating section has a regulating face formed along an outer peripheral surface of the timing belt at a position where the timing belt is stretched around the first pulley, the regulating face is present over a region of 180 degrees or more occupied by an arc section of the timing belt at a position of the first pulley.

5. The drive device according to claim 4, wherein
the first pulley includes a shaft member, and
a bearing that rotatably supports the shaft member and a frame to which the bearing is attached in a state of being inserted into an insert section are provided,
the belt regulating section includes
a first plate having the regulating face,
a second plate that is positioned along a plate face of the first plate and that is fixed to the frame, and
a joint plate section that couples the first plate and the second plate together.

6. The drive device according to claim 5, further comprising:
a detachment restriction section that restricts movement of the bearing in a direction in which the bearing detaches from the insert section.

7. The drive device according to claim 6, wherein
the detachment restriction section is provided on the second plate.

8. A colorimeter device comprising:
the drive device according to claim 4;
a colorimeter configured to measure a color of an object;
a carriage configured to accommodate the colorimeter, and
a gantry in which the carriage is movably attached and movable in a direction intersecting a moving direction of the carriage.

9. The drive device according to claim 4, further comprising:
a shaft member coupled to the first pulley and disposed in a direction along a rotation axis of the first pulley;
a bearing that rotatably supports the shaft member and
a frame to which the bearing is attached in a state of being inserted into an insert section; and
a detachment restriction section that restricts movement of the bearing in a direction that the bearing detaches from the insert section.

10. A colorimeter device comprising:
a drive device according to claim 9;
a colorimeter configured to measure a color of an object;
a carriage configured to accommodate the colorimeter, and
a gantry in which the carriage is movably attached and movable in a direction intersecting a moving direction of the carriage.

11. A drive device comprising:
a first pulley;
a second pulley;
a shaft member coupled to the first pulley and disposed in a direction along a rotation axis of the first pulley;
a bearing that rotatably supports the shaft member;
a frame to which the bearing is attached in a state of being inserted into an insert section;
a detachment restriction section that restricts movement of the bearing in a direction that the bearing detaches from the insert section;
a timing belt stretched between the first pulley and the second pulley;
a drive motor configured to drivingly rotate the first pulley; and
a belt regulating section that regulates a shifting movement of the timing belt, wherein the belt regulating section has a regulating face formed along an outer peripheral surface of the timing belt at a position where the timing belt is stretched around the first pulley.

12. A colorimeter device comprising:
a drive device according to claim 11;
a colorimeter configured to measure a color of an object;
a carriage configured to accommodate the colorimeter, and
a gantry in which the carriage is movably attached and movable in a direction intersecting a moving direction of the carriage.

* * * * *